G. P. DODGE.
Hydraulic-Hose.
No. 148,428.  Patented March 10, 1874.
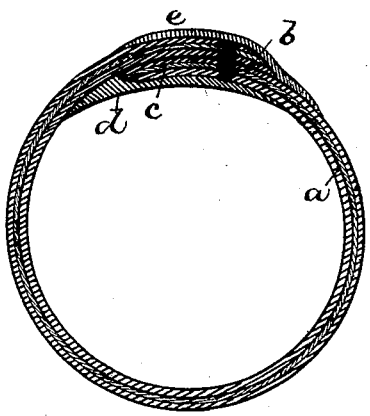
Witnesses.
M. W. Frothingham.
L. H. Latimer.
Inventor.
George P. Dodge,
per Crosby & Gould
Attys.

UNITED STATES PATENT OFFICE.

GEORGE POMEROY DODGE, OF LONDON, ENGLAND.

IMPROVEMENT IN HYDRAULIC HOSE.

Specification forming part of Letters Patent No. 148,428, dated March 10, 1874; application filed January 12, 1874.

*To all whom it may concern:*

Be it known that I, GEORGE POMEROY DODGE, of London, England, have invented an Improvement in the Manufacture of Hydraulic Hose; and I do hereby declare that the following, taken in connection with the drawings which accompany and form part of this specification, is a description of my invention sufficient to enable those skilled in the art to practice it.

The invention relates to the manufacture of that kind of rubber hose in which a rubber or otherwise suitably coated strip of woven material is used to form the hose, said strip being generally wound upon a mandrel until the layers are sufficiently thick, and being then vulcanized by any of the common methods of vulcanization. Such rubber hose as now made is expensive, and my invention relates to a method of construction by which I obtain more perfect, or as perfect hose as can be made by the now well-known processes of manufacture of rubber hose, at a very greatly-reduced cost of manufacture.

In making my improved hose I use a rubber-coated strip of woven material, the strip being only sufficiently wide to form the tube with one edge of the strip lapping the other, and the lapped edges I unite by one or more rows of machine-made or continuous stitches, and over the seams and laps, both inside and outside of the tube, I place a rubber or other suitable welt-strip, said strip being applied to the inside of the tube (and to the outside also, if desirable) as the uniting of the edges of the main strip progresses. Having united the edges of the strip to form the tube and applied the inner welt-strip to cover the seams, (and, if desirable, the outer strip also,) I place the tube upon a mandrel and vulcanize the structure, thereby forming a rubber hose of single ply, very strong, free from liability to leakage, and at a cost much below the cost of making rubber hose by winding a coated strip round and round a mandrel to form the tube and vulcanizing the tube so formed.

The invention consists in the hose so made.

The drawing represents a section of the improved hose.

The coated strip *a* (coated on the side that is to form the inner surface of the tube, and preferably coated upon both sides) has its edges *b c* brought together and lapped, and as brought together the edges are united by one or more rows of stitches, preferably made by a stitch-forming mechanism. As the edges are brought together and lapped and united, the inner welt-strip *d* is laid under the seams made by the stitches and the lapping edge *c*, this strip being made either of rubber compound or of rubber-coated cloth, and being made to temporarily adhere to the inner rubber surface of the tube by any suitable cement. A similar strip, *e*, may be similarly or subsequently applied to cover the outer seams, and this strip may be a circumscribing strip, or simply a narrow strip covering the seams, as shown in the drawing. If made to encompass the tube, the strip of which the tube is primarily formed may be coated only upon its inner side with rubber. The welt-strips may be strips formed wholly of rubber compound or rubber-coated cloth. The tube, having been thus prepared, is mounted upon a suitable mandrel, and is then vulcanized to homogeneously unite all of the rubber surfaces in contact.

I claim—

Rubber hose formed by connecting or first uniting the edges of the coated woven strip, and applying the welt or welts to cover the seams, and then vulcanizing the tube, substantially as described.

GEO. P. DODGE. [L. S.]

Witnesses:
L. J. STEWARD,
79 *Upper Thames street, E. C.*
R. BLAKE,
79 *Upper Thames street.*